(12) United States Patent
Nastke et al.

(10) Patent No.: US 6,861,145 B2
(45) Date of Patent: Mar. 1, 2005

(54) SOLID MATTER MICRO-ENCAPSULATED BY AN AMINOPLAST AND METHOD FOR PRODUCING THE SAME

(75) Inventors: Rudolf Nastke, Bergholz-Rehbrucke (DE); Gerald Rafler, Potsdam (DE)

(73) Assignee: Fraunhofer-Gesellschaft zur Forderung der Angewandten Forschubg E.V., Munich (DE)

( * ) Notice: Subject to any disclaimer, the term of this patent is extended or adjusted under 35 U.S.C. 154(b) by 119 days.

(21) Appl. No.: 10/398,631

(22) PCT Filed: Oct. 2, 2001

(86) PCT No.: PCT/EP01/11376
§ 371 (c)(1),
(2), (4) Date: Apr. 30, 2003

(87) PCT Pub. No.: WO02/30556
PCT Pub. Date: Apr. 18, 2002

(65) Prior Publication Data
US 2004/0175494 A1 Sep. 9, 2004

(30) Foreign Application Priority Data
Oct. 9, 2000 (DE) .......................................... 100 49 777

(51) Int. Cl.⁷ .............................. B32B 5/16; B01J 13/02
(52) U.S. Cl. ................... 428/402.24; 428/403; 264/4.1; 264/4.3; 264/4.33; 264/4.7
(58) Field of Search ............................ 428/402.24, 403; 264/4.1, 4.3, 4.33, 4.7

(56) References Cited

U.S. PATENT DOCUMENTS 4,105,823 A * 8/1978 Hasler et al.
4,454,083 A * 6/1984 Brown et al.
4,525,520 A * 6/1985 Shioi et al.
4,898,696 A * 2/1990 Sliwka
5,576,009 A * 11/1996 Nastke et al.

FOREIGN PATENT DOCUMENTS

| DE | 198 14 880 A1 | * | 10/1999 |
| EP | 0 017 386 B1 | * | 12/1984 |
| EP | 0 532 462 B1 | * | 2/1997 |
| EP | 0 940 171 A2 | * | 9/1999 |

OTHER PUBLICATIONS

Kaye, B. H., "Microencapsulation: The Creation of Synthetic Fine Particles with Specified Properties," KONA, No. 10, 1992.*

Matson Dean W. et al., "Rapid Expansion of Supercritical Fluid Solutions: Solute Formation of Powders, Thin Films, and Fibers": Ind. Eng. Chem. Res. 1987, 26, pp. 2298–2306.*

* cited by examiner

*Primary Examiner*—Samuel A. Acquah
(74) *Attorney, Agent, or Firm*—Barnes & Thornburg LLP

(57) ABSTRACT

This invention relates to micro-encapsulated particles of solid matter and a quasi-continuous method for producing the same, especially those having water-insoluble characteristics or a hydrophobic form, taking into careful consideration ecologically and economically favorable ways of recycling the media used, and the resulting smallest possible amount of waste products such as waste water and polymer residues, while simultaneously ensuring that even exposed parts of the solid bodies are coated, such as crystal tips and grooves, which are insufficiently coated using standard methods due to the hydrodynamic conditions on these areas.

24 Claims, No Drawings

SOLID MATTER MICRO-ENCAPSULATED BY AN AMINOPLAST AND METHOD FOR PRODUCING THE SAME

CROSS-REFERENCE TO RELATED APPLICATIONS

This application is a U.S. national counterpart application of international application serial no. PCT/EP01/11376 filed Oct. 2, 2001, which claims priority to German application serial No. 100 49 777.2 filed Oct. 9, 2000.

BACKGROUND AND SUMMARY OF THE INVENTION

The invention relates to particles of solid material micro-encapsulated by an aminoplast and to a quasi-continuous method for the production thereof taking into account in particular environmentally relevant aspects by means of controlled recycling of the media used.

Micro-encapsulated particles of solid material are used in agriculture and forestry, in hygiene products, in the human and veterinary field, in the cosmetic industry, in products of the food industry, packaging industry, construction industry and also enamel and paint industry, in the environmental protection sphere and in many other commercial products. Their use occurs as dispersions, free-flowing powders or direct incorporation in other materials, in particular in the polymer sector by injection-moulding, sintering, extrusion or other current shaping methods.

The micro-encapsulation by means of amino resins is described in the literature in many ways. Thus for example EP 0 017 386 teaches the use of substances micro-encapsulated by amino resins in the field of the production of carbon paper. A specific modification of the wall-forming amino resin used constitutes as a rule a main emphasis of the inventions, which modification has been undertaken primarily with respect to the core material, as U.S. Pat. No. 4,525,520 teaches. The combination with additive materials which are inert relative to the amino resin is also known from EP 0 532 462.

Generally, primarily liquid components are micro-encapsulated and this relates very particularly to the use of amino resins as wall-forming materials. Usually coating methods are used for solid materials, which methods are based primarily on physical principles, such as for example the Wurster technique and other spray-coating methods, coating or granulating methods (cf. B. H. Kaye "Microencapsulation" KONA 10 (1992) 65) or complex methods are applied using supercritical solvents (Ind. Eng. Chem. Res. 26 (1987) 2298).

Direct micro-encapsulation of solid materials is described in EP 0 940 171 which use complex polymer/monomer compositions.

The problem with micro-encapsulation of solid materials is produced by their hydrodynamic behaviour, in particular if this concerns irregular shapes or even needle-shaped, crystalline products. At the exposed points of these materials (needle tips, sharp edges on crystals, cavities or pores or the like), there are formed high flow rates and flow turbulences which prevent a qualitatively tolerable coating of the material in this region. Because of the high flow rates, the accumulating prepolymer colloids are rapidly removed again. A reduction in the flow rate is however not generally possible since agglomeration, aggregation and coalescence occur to a greater extent. Continuous micro-encapsulation methods are also known from U.S. Pat. No. 4,454,083 and from U.S. Pat. No. 4,105,823 in which amino resins are also used as co-components. In U.S. Pat. No. 4,898,696, a method is described which operates with water-soluble high polymers with strong acid groups which serve as hardening components for melamine-formaldehyde pre-condensates. It is hereby a disadvantage that the high polymer product used is either incorporated into the capsule wall or tends to precipitate or flocculate during the generation process and is then difficult to separate from the capsule product. One often observes then also agglutination of the individual particles, agglomeration and aggregate formation.

The object therefore underlying the invention is to develop micro-encapsulated particles of solid material and a quasi-continuous method for the production thereof, by means of which these described defects are avoided.

This object is achieved by the generic particles of solid material with the features of claim 1 and the generic method for their production with the features of claim 4. Uses according to the invention of the method are characterised by the features of claims 21 and 22. The respective sub-claims contain advantageous developments.

According to the invention, the particle of solid material micro-encapsulated by an aminoplast comprises a particle, the surface of which is encapsulated by an aminoplast. The aminoplast thereby comprises the condensation product of partially etherified amino resin pre-condensates. At least one of these amino resin pre-condensates has thereby been modified by co-condensation with an ethoxylated fatty amine, as a result of which an increased surface activity of these components is achieved. Due to the high surface activity, the encapsulation of the particle of solid material is therefore also possible at exposed positions with high homogeneity and uniformity.

The thickness of the encapsulation, i.e. the layer thickness of the aminoplast, is preferably more than 50 nm and less than 300 nm.

A preferred embodiment of the invention proposes that the core has been hydrophobised. Furthermore, it is also possible that a hydrophobisation agent is contained in the aminoplast itself. However, the embodiment is preferred in which a hydrophobisation has been implemented before the encapsulation.

The advantage of this embodiment can be seen in the fact that a series of solid materials are sensitive to hydrolysis. Remedial action can now be taken here due to the hydrophobisation step. It is hereby preferred if the solid materials are treated preferably with polydimethylsiloxanes and particularly preferred with those which have hydroxy end groups in the form of the commercially available product or dissolved in a diluted form in a suitable organic solvent which is compatible also with the solid material. A further suitable hydrophobisation agent is represented by waxes and particularly preferred by paraffin waxes with various melting points between room temperature and 130° (dependent upon the solid material to be hydrophobised), the melt of the wax being applied preferably for the hydrophobisation. However, the use of dissolved waxes instead of the melt is also possible here in many cases. Especially for materials with a high proportion of meso- and macro-pores, liquid paraffins and paraffin oils are also preferably suited. The proportion of hydrophobisation agent applied to the solid material can be 0.05 to 50% by weight relative to the solid material, preferably 0.1 to 20% by weight and particularly preferred 0.5 to 5% by weight.

The method for producing the micro-encapsulated particles of solid material is divided into the following method steps:

a) Micro-encapsulation process,
b) Maturing process (post-curing),
c) Separation method including drying of the micro-encapsulated material,
d) Reprocessing and regeneration of the continuous medium (original solution).

Water and the reactants are introduced thereto in a suitable reaction vessel, equipped with suitable agitation and measuring technology and heating, regenerated original solution from the process being able to be introduced, in part or also exclusively, instead of water.

For the condensation into the aminoplast, generally two types of amino resin pre-condensates A and B are used. The pre-condensate A therefore concerns a melamine resin pre-condensate which has been partially methylated, with a comparatively high methylol group content and a low imino functionality. A further characteristic feature of the pre-condensate is its arbitrary water compatibility or dilutability. The pre-condensate B ensures a surface-active character of the system which is substantially increased with an increasing degree of condensation and consequently ensures the coating of the hydrodynamically disadvantaged solid material portions. Derived from the synthesis specification B, it is also possible to use a pre-condensate from DE 198 14 880. It is characteristic and indispensable for the configuration of the quasi-continuous operation that the adjusting equilibrium between the polymer deposited on the solid material and the pre-polymer remaining in the solution in the reaction system is capable of no noteworthy further polycondensation. Only by separation of the micro-encapsulated solid material does the reaction proceed slowly. This is effectively retarded by renewed addition of pre-condensate (building up). The regenerated medium is supplied to a renewed micro-encapsulation synthesis.

In the proposed system, it is necessary to use buffering catalysts which ensure a constant pH value of the system. Conditioned by the melamine used in the pre-condensate, a protonation of the melamine can be effected even at a pH of approximately 4.0, the buffering acid catalyst then imparting the equilibrium here.

Dependent upon the reaction temperature and the pH value of the medium (cf. Table 1), the dwell time in the reaction vessel is between 5 and 30 minutes.

Subsequently, the micro-encapsulation dispersion is transferred into the maturing reactor by the use of suitable pumps or better by means of gravity. The maturing reactor is filled during moderate agitation, the inlet being attached conveniently on the vessel base and the outlet to the separation plant being attached in the upper vessel region. The agitator in the maturing reactor should have a discharge of the material in the direction of the vessel base. Heating of the maturing reactor is in fact favourable but is not absolutely required in every case. The size ratio of reaction vessel to maturing reactor should not fall below the factor 10 in order that a sufficiently high dwell time of the generated micro-encapsulated product in the maturing reactor is ensured. Instead of the size of the maturing reactor, it is of course also possible to use a vessel cascade, a loop reactor or also a flow pipe which does not impair the required contents. The average dwell time of the micro-encapsulated products in the maturing reactor should not fall below 30 minutes.

After conclusion of the maturing process, separation of the product from the liquid (original solution) is effected for example continuously via a trailing blade centrifuge or quasi-continuously via a suction filter cascade with discharge of the product.

Next drying takes place in the normal manner, the drying temperatures being able to move within the range of room temperature to 150° C. dependent upon the core material. In the case of application of dispersions, separation and drying processes can be partially dispensed with and the dispersion can be used directly after possibly further formulation.

When using the separation methods, the pH value and the conductivity in the separated original solution after build-up of the volume is determined in a conventional suitable manner and also the acid content is determined titrimetrically. When using surface-active additives or protective colloids, these can also be determined by suitable methods.

In laboratory tests, the equilibrium concentration of amino resin combinations was determined (e.g. nitrogen determination, FTIR spectroscopy and the like). This can be dependent upon the core material and also upon the type and concentration of catalyst used and should be determined by changing these parameters before application in laboratory tests.

The regenerated original solution is then transferred into the supply vessel provided for this purpose and is therefore available for re-use in the micro-encapsulation process.

If the necessity for re-washing of the product is present, this should be effected in a semi-continuous operation on the trailing blade centrifuge or suction filter, a first proportion of approximately 20% of the total quantity being able to be supplied likewise to the original solution. A minimal strain on sewage or on the environment is hence ensured. When connecting two reaction vessels with optional actuation of the individual vessels, the implementation of the quasi-continuous process is possible.

A melamine-formaldehyde pre-condensate is used preferably for the polycondensation, 5 mol formaldehyde per mol melamine being used.

Between 2 and 4 methylol groups of the pre-condensate A are preferably etherified with methanol, 3 methylol groups are particularly preferred.

The pre-condensate A can preferably be stabilised by the addition of substances containing amide groups and also by alcanol amines.

The co-condensation of the pre-condensate B is implemented preferably by adding 5 to 50%, particularly preferred 15%, of an ethoxylated fatty amine. The fatty amine used has preferably a KOH number between 80 and 140 and particularly preferred between 110 and 120. The temperature for this co-condensation lies thereby preferably between 20 and 80° C. and particularly preferred 60° C., the reaction duration being no shorter than 30 minutes and no longer than 120 minutes, the reaction being implemented preferably for 60 minutes.

It is advantageous if the mass ratio relative to 100% solid resin content between the pre-condensates A and B is between 1:0.2 and 1:10, particularly advantageous however is a mass ratio relative to 100% solid resin content of 1:1.

Organic acids, such as formic acid, acetic acid, ascorbic acid, citric acid and other organic acids with sufficiently high water solubility can be used optionally. Equally, use of acid combinations is also indicated, such as citric acid/phosphoric acid, ascorbic acid/hydrochloric acid, ascorbic acid/formic acid and the like or the use of combinations of organic acids with acidic salts, such as acetic acid/acetates, ascorbic acid/tartrates inter alia.

The coated particles of solid material produced according to the method according to the invention relate in particular to metallic particles, such as metal flakes, metal oxides, such as aluminium oxide, titanium dioxide, zinc oxide, iron oxides or other metals and also crystalline water-insoluble or water-soluble previously hydrophobised materials, colourants, marker colours or also magnetisable particles which are used in the most varied of industrial and commercial fields.

The subject according to the invention is now intended to be explained by way of example with reference to the following examples.

EXAMPLE A

Production of a modified, partially etherified melamine resin

Into a suitable agitated vessel, equipped with agitator, heating and cooling device and vacuum distillation device, there is added for example 4450 ml 30% by weight aqueous formaldehyde, heated to 80° C. and the pH value is set at pH 9 by means of a concentrated caustic soda solution. Subsequently, 1000 g melamine are introduced. The temperature rises to approximately 90° C. through the exothermic reaction course. After the solution has become clear (dissolution of the melamine with methylol formation), it is rapidly cooled to 60° C. The forming crystalline precipitation (methylol melamine) is diluted with 4300 ml methanol and subsequently the pH value is adjusted downwards with hydrochloric acid to values of 1 to 2. The reaction is agitated further until the solution becomes clear. Subsequently, the pH value is set at 8 to 9 with triethanol amine. At a temperature of 60° C., 2500 ml of a methanol-water mixture are then distilled off, at reduced pressure. The resultant resin solution has a solid material content of approximately 41% and is stabilised by the addition of 166 g urea. The synthetic resin is stable in room conditions for at least 6 months.

EXAMPLE B

Synthesis of a modified, partially etherified melamine-formaldehyde resin with surface-active character In a heatable agitated vessel equipped with agitator and reflux cooler, for example 500 g of a commercially available, highly hydroxymethylated amino resin pre-condensate etherified partially with methanol on a melamine basis, for example Cymel 373 of Cytec Deutschland GmbH are introduced.

Subsequently there is introduced 100 g of an ethoxylated fatty amine, e.g. ethoxylated tallow fat amine with an alkali number of approximately 115 mg KOH/g and the pH value is set at 7.5 to 8.5 by means of 2N aqueous citric acid and is heated with reflux over 60 minutes at 60° C. After cooling a syrupy honey yellow product is obtained which can be stored for over at least 3 months.

EXAMPLE C

Synthesis of micro-encapsulated solid material

In a reactor equipped with corresponding agitator technology, for example 60 l water are introduced and heated to 60° C. From suitable supply vessels, there are incorporated successively 7 litres 2N aqueous citric acid solution, 6 litres of the melamine resin solution from example A and 3 litres of the melamine resin solution from example B. The point in time of the resin addition is registered. The two resin solutions can also be mixed in advance. After a pre-condensation time of 5 minutes, for example 10 kg of a metal oxide powder (e.g. titanium dioxide with a particle size distribution $d_{50}$=5 µm, $d_{90}$=10 µm, packing density 1,000 g/dm$^3$) are introduced rapidly during agitation. In the present case agitation takes place with a turbine agitator at 1000 rpm. This is left to agitate further for 10 minutes at a temperature of 60° C. and then is transferred particularly favourably according to the gravity principle into the maturing vessel. Here the product is further agitated at a temperature of 60° C. The product discharge from the maturing vessel is measured such that an average dwell time of the individual charge of 120 minutes results. The removed product is de-watered continuously via a trailing blade centrifuge or quasi-continuously via a suction battery. The original solution is returned into the supply vessel provided for this purpose and is re-used during synthesis after regeneration. The discharged moist product is dried in a suitable manner and possibly graded. Using the cited operation there are obtained titanium dioxide particles with an amino resin coating with a thickness of on average 180 nm.

What is claimed is:

1. Particles of solid material micro-encapsulated by an aminoplast, wherein the aminoplast is the condensation product from partially etherified amino resin pre-condensates, of which at least one component has a high surface activity due to a co-condensation with an ethoxylated fatty amine with a KOH number between 80 and 140.

2. Particles of solid material according to claim 1 wherein the thickness of the micro-encapsulation on the entire particle is more than 50 nm.

3. Particles of solid material according to claim 1 wherein the thickness of the micro-encapsulation on the entire particle is less than 300 nm.

4. Particles of solid material according to claim 1 wherein the surface of the particle is hydrophobized and/or a hydrophobization agent is contained in the aminoplast.

5. A method for production of particles of solid material micro-encapsulated by aminoplasts wherein
   a) the particles of solid material are introduced into a reaction vessel in which an acid catalyzed polycondensation occurring in aqueous phase is implemented by at least two amino resin pre-condensates, of which at least one has been modified due to co-condensation with an ethoxylated fatty amine with a KOH number between 80 and 140
   b) a post-curing of the polymer is effected in a collection vessel
   c) the micro-encapsulated particles of solid material are separated from the original solution and are dried and
   d) the original solution is re-processed and re-supplied to the method.

6. The method according to claim 5 wherein a component A from the amino resin pre-condensates is partially etherified with methanol and a component B is modified in a surface-active manner by co-condensation with an ethoxylated fatty amine.

7. The method according to claim 5 wherein the component A has 5 mol formaldehyde per mol melamine.

8. The method according to claim 5 wherein at least 2 and at most 4 methylol groups are etherified with methanol in the case of component A.

9. The method according to claim 5 wherein three methylol groups are etherified with methanol in the case of component A.

10. The method according to claim 5 wherein the component A has been stabilized with a substance containing amide groups and with an alcanol amine.

11. The method according to claim 5 wherein the component B is produced by co-condensation with 5 to 50% of an ethoxylated fatty amine.

12. The method according to claim 11 wherein the component B is produced by co-condensation with 15% of an ethoxylated fatty amine.

13. The method according to claim 5 wherein the ethoxylated fatty amine has a KOR number between 110 and 120.

14. The method according to claim 5 wherein the co-condensation of component B is implemented at temperatures between 20 and 80° C.

15. The method according to claim 14 wherein the co-condensation of component B is implemented at a temperature of 60° C.

16. The method according to claim 5 wherein the duration of the co-condensation of component B is between 30 and 120 mm.

17. The method according to claim 16 wherein the duration of the co-condensation of component B is 60 mm.

18. The method according to claim 5 wherein the mass ratio relative to the solid resin content of components A to B is between 1:0.2 and 1:10.

19. The method according to claim 18 wherein the mass ratio relative to the solid resin content of components A to B is 1:1.

20. The method according to claim 5 wherein organic acids, or mixtures thereof are used as the catalyzing acid.

21. The method according to claim 5 wherein mixtures of organic acids and inorganic acids are used as the catalyzing acid.

22. The method according to claim 5 wherein the catalyst is active in a pH range of 2 to 7.

23. The method according to claim 22 wherein the catalyst is active in a pH range of 3.5 to 4.

24. The method according to claim 5 wherein 0.05 to 10% by weight hydrophobization agent relative to the weight of the core material is applied to the particle of solid material and the encapsulation is subsequently implemented.

\* \* \* \* \*